May 14, 1968   E. L. CHIVERS   3,382,630
MOUNTINGS FOR AIRCRAFT WINDSCREENS
Filed Jan. 5, 1966

EDWARD L. CHIVERS
INVENTOR

By Nolte and Nolte
attys

United States Patent Office 3,382,630
Patented May 14, 1968

3,382,630
MOUNTINGS FOR AIRCRAFT WINDSCREENS
Edward L. Chivers, Southbourne, Bournemouth, England, assignor to British Aircraft Corporation (Operating) Limited, London, England, a British company
Filed Jan. 5, 1966, Ser. No. 518,959
Claims priority, application Great Britain, Jan. 6, 1965, 616/65
8 Claims. (Cl. 52—208)

ABSTRACT OF THE DISCLOSURE

The present invention includes an aircraft windscreen mounting, designed to relieve the transparent panel or panels from stresses arising from flexure of the fuselage structure of an aircraft in which the transparent panels are attached to the supporting structure by countersunk headed bolts passing with clearance through apertures in the panel and in the supporting structure, a flexible cup washer with a part-spherical under surface being disposed under the head of each bolt and received in a corresponding part-spherical seating in the panel so that the bolts can tilt laterally in response to distortion of the supporting structure. Radiused washer pads are interposed between the panel and the supporting structure to permit the panel to adjust itself to flexure of the supporting structure and self-aligning nuts are used on the inner ends of the bolts. A pair of flexible sealing gaskets are fitted between the edge of the panel and the supporting structure, one inside and one outside the ring of bolts. The outer edges of the panel may be provided with metal reinforcing strips and metal bushings may be provided within the bolt-seating apertures.

The invention has reference to the windscreens which are used in aircraft. The transparent panel or panels of such windscreens is or are usually made of a number of laminations of glass and transparent plastics, the constructional arrangement of the laminations and the thickness of the component layers thereof having been evolved by experience in accordance with requirements such as clear visibility, strength, ability to contain temperature gradients through the thickness, and the like.

The fuselage structure to which an aircraft windscreen is fixed is subject to distortion under varying aerodynamic, thermodynamic, pressurisation and maneuvering loads applied from time to time, and such distortion is transmitted to the margins of the windscreen panels where they are secured to the structure. For this reason, and also because of manufacturing limitations, the laminations of the panels may become separated, giving rise to impaired transparency and strength, a failure which might have serious consequences in a pressurised aircraft, in which a fracture would result in a de-pressurisation.

It is an object of the present invention to provide an improved mounting for an aircraft windscreen in which the transparent panel or panels is or are at least partly relieved of stresses arising from flexure of the fuselage structure.

According to the invention, an aircraft windscreen comprises at least one transparent panel which is attached to a supporting structure by means of bolts arranged so as to be capable of undergoing lateral tilting motion in response to distortion of said structure, the panel being arranged to bear against the structure through the medium of washer pads or like members capable of permitting self-adjustment of the panel to flexure of the structure.

A particular embodiment of the invention will now be described in more detail by way of example and with reference to the accompanying drawings, in which.

Figure 1:
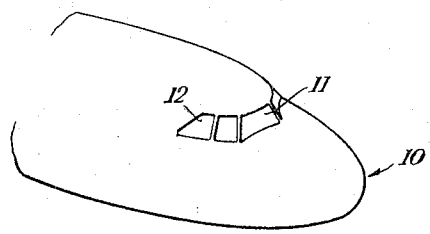
FIG. 1 is a diagrammatic view of the nose of an aircraft.
Figure 2:
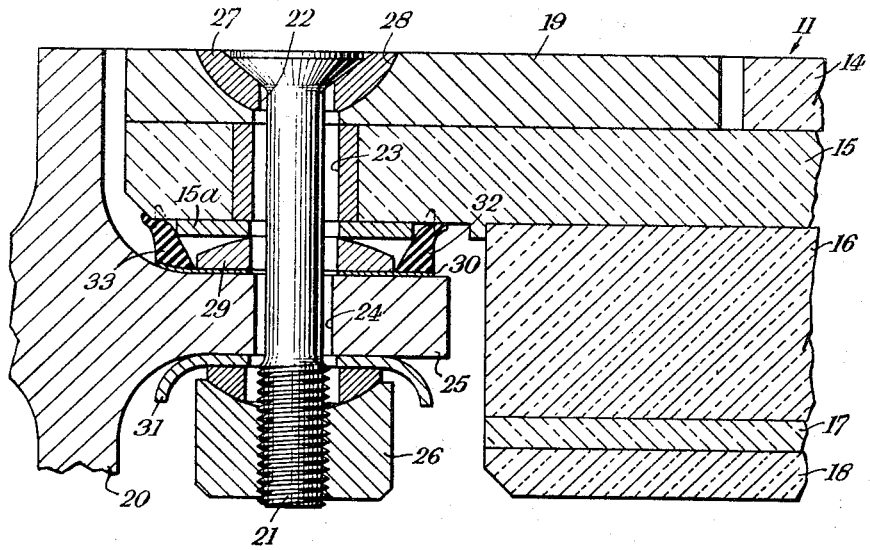
FIG. 2 is a section through the mounting of one of the transparent front panels of the windscreen, the fuselage structure being in an unflexed condition.
Figure 3:
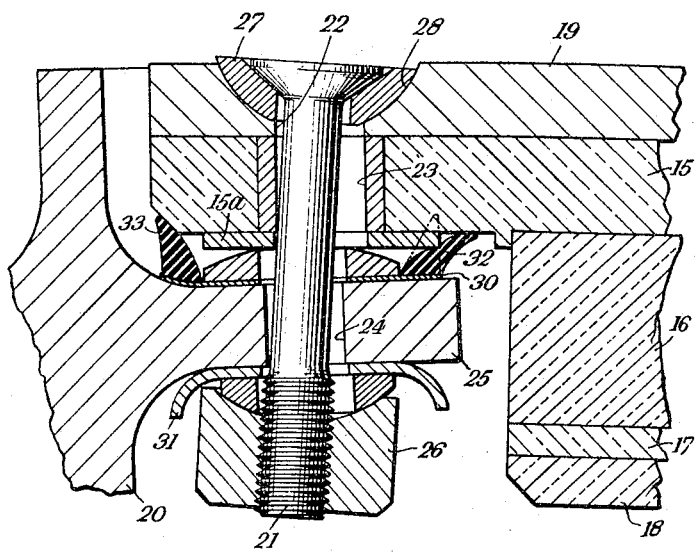
FIG. 3 is a similar view to FIG. 2, showing how the mounting can accommodate flexure of the fuselage structure.

In the embodiment illustrated, the pilot's cabin in the nose 10 of the aircraft fuselage has a windscreen incorporating front transparent panels 11 and side transparent panels 12. As seen in FIGS. 2 and 3, each panel 11 is laminated, comprising an outwardly facing glass layer 14, a first relatively thick layer 15 of a vinyl plastic, a relatively thick layer 16 of tempered glass, a relatively thin second layer 17 of vinyl plastic and an inwardly facing layer 18 of low-tempered glass. The edges of the first plastics layer 15 project beyond those of the other layers and carry an outwardly facing marginal metal strip 19, whose surface lies flush with that of the outwardly facing glass layer 14 and the outer surface of the adjoining part 20 of the aircraft fuselage. The inside of the projecting edges of the layer 15 is provided with a metal reinforcing strip 15a.

The panel 11 is attaced to the fuselage part 20 by countersunk head bolts 21. Each bolt 21 passes with clearance through a countersunk hole 22 in the metal strip 19, a corresponding metal-bushed aperture 23 in the projecting edge of the plastics layer 15 and a corresponding hole in the reinforcing strip 15a, and then through an aperture 24 in a flange 25 of the fuselage part 20, being secured on the inside of the flange 25 by a self-aligning nut 26 of known type.

A flexible low-friction cup washer 27 is interposed between the underside of the head of the bolt 21 and its countersunk seating 28 in the metal strip 19. The seating 28 is part-spherical in form, as is the undersurface of the cup washer 27. The cup washer 27 is made of a material which has a sufficiently low coefficient of friction to enable the washer 27 to move in its seating 28 so as to permit the bolt 21 to tilt relative to the panel 11 without bending, even when the nut 26 has been tightened, as well as adequate strength to resist the crushing load imposed by tightening of the nut 26. An example of such a material is a nylon impregnated with molybdenum disulphide, e.g. the material sold under the name Nylatron G.S.

An apertured metal washer pad 29 is interposed between the reinforcing strip 15a of the layer 15 and the flange 25 of the fuselage part 20. The washer pad 29 has a convex upper surface adjoining the reinforcing strip 15a and fits with clearance around the bolt 21. A strip of glasscloth 30 may be interposed as shown between the washer pad 29 and the flange 25.

A pair of flexible sealing gaskets 32, 33 are fitted between the edge of the layer 15 and the flange 25, one inside and one outside the bolts 21. These gaskets, in the uncompressed state, may be of triangular section (as shown) or of circular section.

The self-aligning nut 26 bears on the underside of the flange 25 through a plate 31 and can accommodate itself to tilting movements of the bolt on distortion of the adjacent parts of the fuselage structure, as can be seen in FIG. 3.

What I claim as my invention and desire to secure by Letters Patent is:

1. An aircraft windscreen comprising at least one transparent panel, a supporting structure, headed bolts attaching said panel to said supporting structure, a cup washer between the head of each bolt and said panel, each cup washer having a part-spherical undersurface received in a corresponding part-spherical seating in the panel thereby enabling lateral tilting motion of said bolt in response to distortion of said structure, and washer pads interposed between the panel and the supporting structure and adapted to permit self-adjustment of the panel to flexure of the said structure.

2. An aircraft windscreen according to claim 1, wherein each bolt passes with clearance through apertures in the panel and in the supporting structure and has its head countersunk substantially flush with the exterior of said panel.

3. An aircraft windscreen according to claim 1, wherein the cup washer is made of a low-friction material with a high crushing strength.

4. An aircraft windscreen according to claim 3, wherein the cup washer is made of nylon impregnated with molybdenum disulphide.

5. An aircraft windscreen according to claim 1, wherein each of the washer pads has a radiused surface on the side adjoining the panel.

6. An aircraft windscreen comprising at least one transparent panel, a supporting structure, bolts attaching said panel to said supporting structure, each bolt passing with clearance through apertures in the panel and in the supporting structure and having a countersunk head, a flexible cup washer disposed under the head of each bolt and having a part-spherical undersurface received in a corresponding part-spherical seating in the panel, washer pads interposed between the panel and the supporting structure and each having a radiused surface on the side adjoining the panel, self-aligning nuts on the bolts adapted to tighten the bolts against the supporting structure, and at least one flexible sealing gasket fitted between the edge of the panel and the supporting structure.

7. An aircraft windscreen according to claim 6, wherein the panel is of laminated construction, of alternate layers of glass and plastics material, and the edge portions of one of the layers of plastics material project beyond the edges of the other layers, outward and inward facing metal marginal reinforcing strips are secured to said projecting edge portions, the apertures which receive the bolts pass through said projecting edge portions and its reinforcing strips, and metal bushes are provided within said apertures.

8. An aircraft windscreen according to claim 6, wherein a pair of said flexible sealing gaskets are fitted between the edge of the panel and the supporting structure, one inside and one outside the bolts.

References Cited
UNITED STATES PATENTS

| | | | |
|---|---|---|---|
| 2,398,886 | 4/1946 | Drake et al. | 52—208 |
| 2,834,998 | 5/1958 | Wilder | 52—208 |
| 3,220,289 | 11/1965 | Farekas | 85—50 X |

KENNETH DOWNEY, *Primary Examiner.*